United States Patent
Bae et al.

(10) Patent No.: US 10,003,296 B2
(45) Date of Patent: Jun. 19, 2018

(54) APPARATUS FOR CONTROLLING OPERATION OF POWER CONVERSION DEVICE AND MONITORING OPERATION STATE OF RELAY

(71) Applicant: LSIS CO., LTD., Gyeonggi-do (KR)

(72) Inventors: Tae-Suk Bae, Gyeonggi-do (KR); Chun-Suk Yang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 15/355,964

(22) Filed: Nov. 18, 2016

(65) Prior Publication Data

US 2017/0310208 A1    Oct. 26, 2017

(30) Foreign Application Priority Data

Apr. 26, 2016  (KR) .................. 10-2016-0051148

(51) Int. Cl.
  *H02M 7/48*   (2007.01)
  *H02P 29/024* (2016.01)
  (Continued)

(52) U.S. Cl.
  CPC ............. *H02P 29/025* (2013.01); *H02H 9/00* (2013.01); *H02M 1/08* (2013.01); *H02M 7/48* (2013.01); *H02P 1/04* (2013.01)

(58) Field of Classification Search
  CPC ...................................... H02M 7/48
  See application file for complete search history.

(56) References Cited

U.S. PATENT DOCUMENTS

| 3,631,332 A | 12/1971 | Williamson |
| 2008/0157775 A1* | 7/2008 | Finney ............... G01R 31/3277 324/418 |

(Continued)

FOREIGN PATENT DOCUMENTS

| JP | H7-23523 A | 1/1995 |
| JP | H10-136129 A | 5/1998 |

(Continued)

OTHER PUBLICATIONS

Office Action dated Aug. 8, 2017 issued in corresponding Japanese Application No. 2016-226575.

(Continued)

*Primary Examiner* — Nguyen Tran
*Assistant Examiner* — Trinh Q Dang
(74) *Attorney, Agent, or Firm* — K&L Gates LLP (57) ABSTRACT

The present invention relates to an apparatus for controlling the operation of a power conversion device including a rectifier part, an initial charging part, a DC-link part and an inverter part. The apparatus includes: a control part configured to drive a relay connected in parallel to an initial charging resistor of the initial charging part if a DC-link voltage of the DC-link part exceeds a first reference voltage during initial charging for the DC-link part; a relay monitoring part configured to monitor whether or not the relay is normally being operated when the relay is driven; and an inverter driving part configured to stop of the driving of the inverter part if it is determined that the relay is not normally being operated by referring to a result of the monitoring of the relay monitoring part.

5 Claims, 6 Drawing Sheets

(51) Int. Cl.
*H02P 1/04* (2006.01)
*H02M 1/08* (2006.01)
*H02H 9/00* (2006.01)

(56) References Cited

U.S. PATENT DOCUMENTS

| | | | | |
|---|---|---|---|---|
| 2009/0168470 A1* | 7/2009 | Chen | .................... | H02H 7/122 |
| | | | | 363/55 |
| 2013/0293258 A1* | 11/2013 | Lechat | .................... | H02M 1/32 |
| | | | | 324/764.01 |
| 2014/0126259 A1* | 5/2014 | Inoue | .................... | H02M 1/32 |
| | | | | 363/98 |
| 2016/0065103 A1* | 3/2016 | Glenn | .................... | H02H 9/002 |
| | | | | 318/400.21 |
| 2016/0172992 A1* | 6/2016 | Tallam | .................... | H02M 1/36 |
| | | | | 363/37 |

FOREIGN PATENT DOCUMENTS

| | | |
|---|---|---|
| JP | 3521337 B2 | 4/2004 |
| JP | 3638184 B2 | 4/2005 |
| JP | 2012-120376 A | 6/2012 |
| JP | 5229644 B2 | 3/2013 |
| JP | 2014-42406 A | 3/2014 |
| JP | 2015-104222 A | 6/2015 |
| KR | 10-1241226 B1 | 3/2013 |
| KR | 10-2013-0032504 A | 4/2013 |

OTHER PUBLICATIONS

Search Report dated May 19, 2017 issued in corresponding European Application No. 16198611.2.

* cited by examiner

FIG 1

PRIOR ART

FIG 3

APPARATUS FOR CONTROLLING OPERATION OF POWER CONVERSION DEVICE AND MONITORING OPERATION STATE OF RELAY

CROSS REFERENCE TO RELATED APPLICATION

This application claims the benefit of Korean Patent Application No. 10-2016-0051148, filed on Apr. 26, 2016, entitled "APPARATUS FOR CONTROLLING OPERATION OF POWER CONVERSION", which is hereby incorporated by reference in its entirety into this application.

BACKGROUND

1. Technical Field

The present invention relates to an apparatus for controlling the operation of a power conversion device such as an inverter or a converter.

2. Description of the Related Art

An inverter and a converter are representative of power conversion devices. The inverter is a device which converts input AC power into DC power and then again converts the DC power into AC power when is then supplied to a load such as a motor. The inverter is utilized for a variety of products such as a fan, pump, elevator, conveyer, production line and so on. A general-purpose inverter for motor driving converts three-phase AC power into DC power through a rectifier, stores the DC power in a capacitor of a DC-link part, and then converts the stored DC power into AC power through an inverter part.

The converter is a power conversion device which converts input AC or DC power into DC power. The converter converts power in the way similar to the converter and is likewise utilized in various ways throughout the industry.

Figure 1:
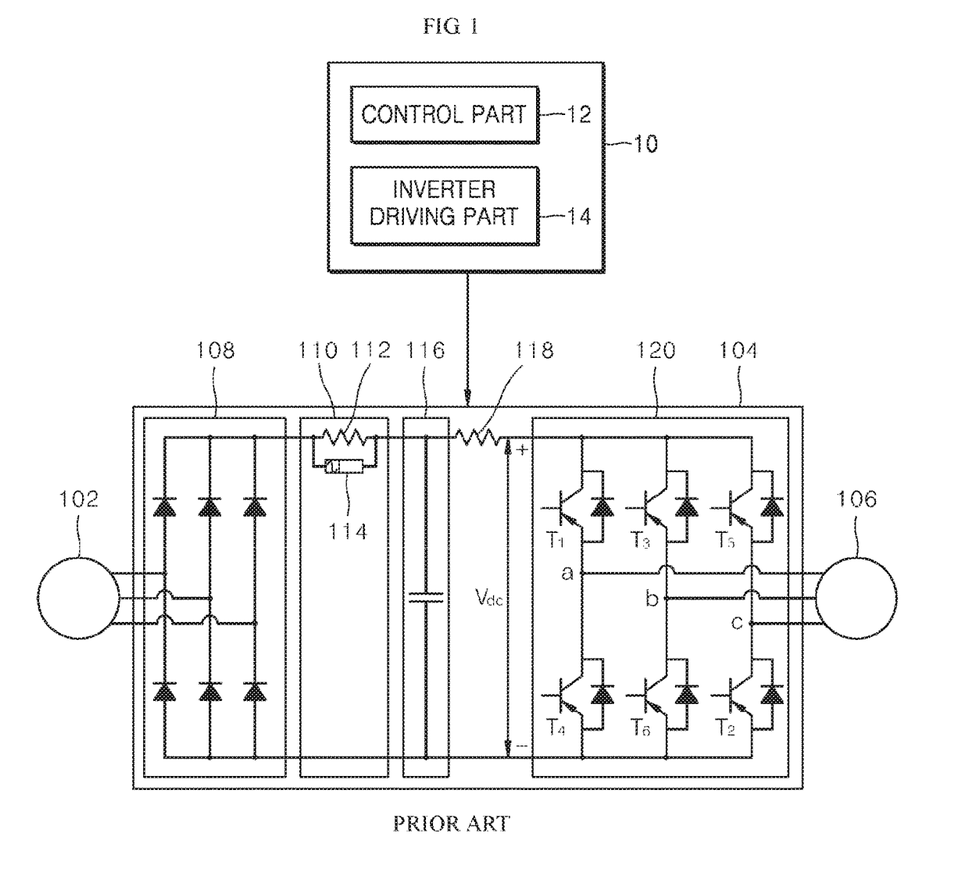
FIG. 1 is a view illustrating the configuration of a conventional power conversion device.

FIG. 1 is a view illustrating the configuration of a conventional power conversion device.

Referring to FIG. 1, a power conversion device such as, e.g., an inverter 104 receives three-phase AC power from a power supply 102 and converts it into DC power through a rectifier part 108. The obtained DC power is stored in a capacitor of a DC-link part 116 and is converted into AC power having a predetermined frequency through an inverter part 120. The AC power obtained thus is supplied to a load 106 such as a motor.

The inverter 104 illustrated in FIG. 1 controls a driving speed of the load 106 by varying a voltage and a frequency according to a PWM (Pulse Width Modulation) output using switching elements T1 to T6 included in the inverter part 120.

An initial charging part 110 is applied to the inverter system as shown in FIG. 1. The initial charging part 110 is provided to prevent an overcurrent from occurring due to an inrush current input to the inverter 104, thereby preventing dielectric breakdown of an element. An initial charging resistor 112 of the initial charging part 110 is operated only when the inverter 104 is initially powered on. After completing the initial charging operation, the initial charging part 110 switches a flow of current to a relay 114 to prevent an unnecessary power loss by the initial charging resistor 112.

According to the conventional power conversion device, a controller 10 as shown in FIG. 1 is used to control such an operation of the inverter 104. The controller 10 includes a control part 12 and an inverter driving part 14.

When the inverter 10 is initially powered on as AC power is applied from the power supply 102 to the inverter 10, the control part 12 controls a current to be flown through the initial charging resistor 112, thereby charging the capacitor of the DC-link part 116 with a voltage. During this initial charging operation, the control part 12 measures a voltage Vdc of the DC-link part 116 and determines whether or not the measured voltage Vdc exceeds a preset reference voltage. If the measured voltage Vdc does not exceed a preset reference voltage, the control part 12 generates a low voltage trip (LVT) to limit the operation of the relay 114 included in the initial charging part 110.

For reference, the term "low voltage trip (LVT)" used herein means a signal indicating that the voltage Vdc of the DC-link part 116 does not exceed the preset reference voltage. The control part 12 can inform the relay 114 or other module that the voltage Vdc of the DC-link part 116 does not exceed the preset reference voltage through the LVT signal. In other words, upon receiving the LVT signal, the relay 114 or other module can recognize that the voltage Vdc of the DC-link part 116 does not exceed the preset reference voltage.

If the measured voltage Vdc exceeds the preset reference voltage, the control part 12 releases the LVT to drive the relay 114. Accordingly, a current is flown into the relay 114 rather than the initial charging resistor 112.

After releasing the LVT, the control part 12 controls the inverter driving part 14 to generate a PWM signal to drive the inverter 104.

However, according to this conventional technique, if the relay 114 is not normally driven due to occurrence of abnormality, the current continues to be flown through the initial charging resistor 112 despite the release of the LVT by the control part 12. At this time, if the load 106 connected to the inverter 104 can be driven only with a small current flown through the initial charging resistor 112, the voltage Vdc of the DC-link part 116 does not fall below the preset reference voltage. Accordingly, even though abnormality occurs in the relay 114, a user cannot detect the abnormality of the relay 114. In this manner, when the current continues to be flown through the initial charging resistor 112 even after the initial charging operation is ended, the relay 114 may be damaged due to overheat, which may result in impossibility of use of the power conversion device.

SUMMARY

It is an aspect of the present invention to provide an apparatus for controlling the operation of a power conversion device, which is capable of reducing a failure rate of the power conversion device and increasing the product reliability by correctly detecting occurrence of abnormality of a relay included in the power conversion device.

It is another aspect of the present invention to provide an apparatus for controlling the operation of a power conversion device, which is capable of correctly detecting occurrence of abnormality of a relay included in the power conversion device with a simple algorithm and low costs.

The present invention is not limited to the above aspect and other aspects of the present invention will be clearly understood by those skilled in the art from the following description. The above and/or other aspects and advantages of the present invention will become apparent and more readily appreciated from the following description of the embodiments, taken in conjunction with the accompanying drawings. It should be understood that the objects and advantages of the present invention can be realized by features and combinations thereof set forth in the claims.

In accordance with one aspect of the present invention, there is provided an apparatus for controlling the operation of a power conversion device including a rectifier part, an initial charging part, a DC-link part and an inverter part, including: a control part configured to drive a relay connected in parallel to an initial charging resistor of the initial charging part if a DC-link voltage of the DC-link part exceeds a first reference voltage during initial charging for the DC-link part; a relay monitoring part configured to monitor whether or not the relay is normally being operated when the relay is driven; and an inverter driving part configured to stop of the driving of the inverter part if it is determined that the relay is not normally being operated by referring to a result of the monitoring of the relay monitoring part.

According to the present invention, it is possible to reduce a failure rate of a power conversion device and increasing the product reliability by correctly detecting occurrence of abnormality of a relay included in the power conversion device.

According to the present invention, it is possible to correctly detect occurrence of abnormality of a relay included in the power conversion device with a simple algorithm and low costs.

DETAILED DESCRIPTION

The above objects, features and advantages will become more clearly apparent from the following detailed description in conjunction with the accompanying drawings. Therefore, the technical ideas of the present invention can be easily understood and practiced by those skilled in the art. In the following detailed description of the present invention, concrete description on related functions or constructions will be omitted if it is deemed that the functions and/or constructions may unnecessarily obscure the gist of the present invention. Hereinafter, preferred embodiments of the present invention will be described in detail with reference to the accompanying drawings. Throughout the drawings, the same or similar elements are denoted by the same reference numerals.

Figure 2:
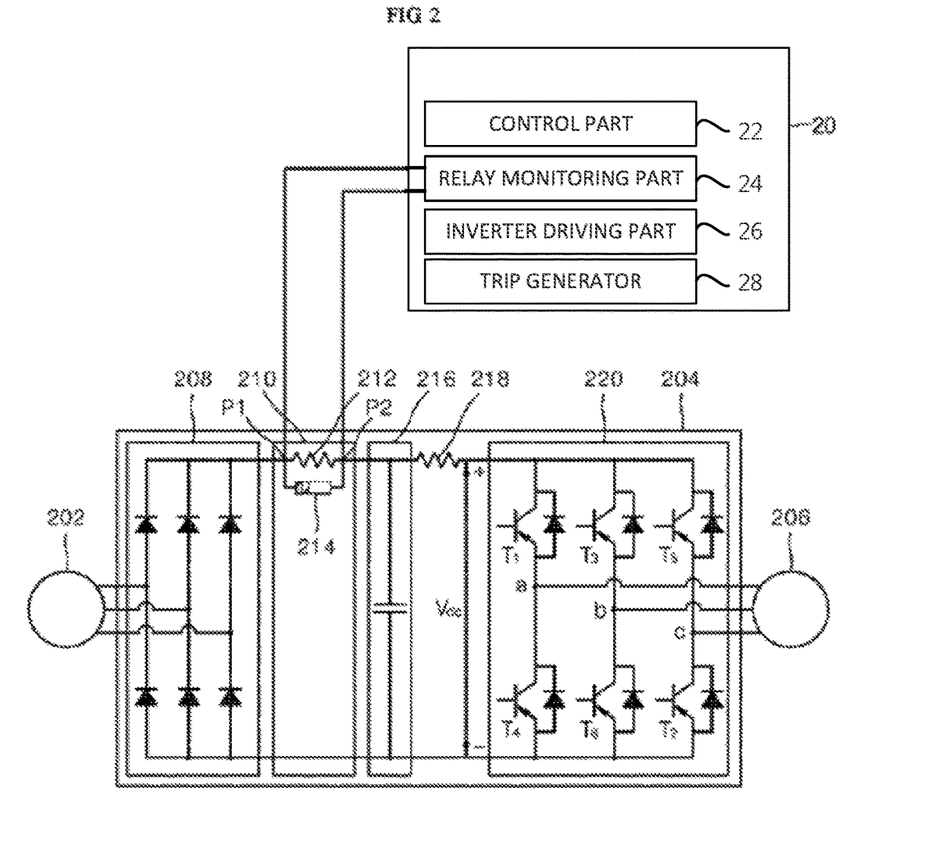
FIG. 2 is a view illustrating the configuration of a power conversion device and an apparatus for controlling the operation of the power conversion device according to one embodiment of the present invention.

FIG. 2 is a view illustrating the configuration of a power conversion device and an apparatus for controlling the operation of the power conversion device according to one embodiment of the present invention.

Hereinafter, a power conversion device will be illustrated with an inverter. For reference, in FIG. 2, although the power conversion device is illustrated with an inverter 204, the apparatus for controlling the operation of the power conversion device of the present invention may be applied to a converter instead of the inverter.

Referring to FIG. 2, a power conversion device such as, e.g., the inverter 204 receives three-phase AC power from a power supply 202 and converts it into DC power through a rectifier part 208. The obtained DC power is stored in a capacitor of a DC-link part 216 and is converted into AC power having a predetermined frequency through an inverter part 220. The AC power obtained thus is supplied to a load 206 such as a motor.

The inverter 204 illustrated in FIG. 2 controls a driving speed of the load 206 by varying a voltage and a frequency according to a PWM output using switching elements T1 to T6 included in the inverter part 120.

An initial charging part 210 is applied to the inverter system as shown in FIG. 2. The initial charging part 210 is provided to prevent an overcurrent from occurring due to an inrush current input to the inverter 204, thereby preventing dielectric breakdown of an element. An initial charging resistor 212 of the initial charging part 210 is operated only when the inverter 204 is initially powered on. After completing the initial charging operation, the initial charging part 210 switches a flow of current to a relay 214 to prevent an unnecessary power loss by the initial charging resistor 212.

Referring to FIG. 2, an apparatus 20 for controlling the operation of the power conversion device according to one embodiment of the present invention includes a control part 22, a relay monitoring part 24 and an inverter driving part 16. In addition, although not shown in FIG. 2, the apparatus 20 for controlling the operation of the power conversion device according to one embodiment of the present invention may further include a trip generator 28.

The control part 22 controls a current input to the initial charging part 210 to be flown through one of the initial charging resistor 212 and the relay 214. To this end, the control part 22 may drive the relay 214 through a relay operation signal (MC). If the relay operation signal (MC) is not applied by the control part 22, the relay 214 is not driven and the current input to the initial charging part 210 is flown through the initial charging resistor 212. If the relay operation signal (MC) is applied by the control part 22, the relay 214 is driven and the current input to the initial charging part 210 is flown through the relay 214.

In one embodiment of the present invention, the control part 22 may monitor (or measure) a voltage Vdc of the DC-link part 216 during initial charging for the DC-link part 216. If the measured voltage Vdc exceeds a preset first reference voltage, the control part 22 drives the relay 214 connected in parallel to the initial charging resistor 212 of the initial charging part 210.

When the relay 214 is driven by the control part 22, the relay monitoring part 24 monitors whether or not the relay 214 is normally being operated. In one embodiment of the present invention, if the relay 214 is normally being operated, the relay monitoring part 24 outputs a first monitoring signal (e.g., a signal of a high level). Otherwise, the relay monitoring part 24 outputs a second monitoring signal (e.g., a signal of a low level).

The control part 22 determines whether or not the relay 214 is normally being operated, based on a monitoring signal output from the relay monitoring part 24. If it is determined that the relay 214 is not normally being operated, the control part 22 transmits a relay malfunction signal (MCT) to the inverter driving part 26. Upon receiving the relay malfunction signal (MCT), the inverter driving part 26 stops the driving of the inverter part 220 by not applying a PWM signal to the gates of the switching elements T1 to T6 included in the inverter part 220. Conversely, upon not receiving the relay malfunction signal (MCT), the inverter driving part 26 drives the inverter part 220 by applying the PWM signal to the gates of the switching elements T1 to T6 included in the inverter part 220.

If it is determined, based on a result of the monitoring by the relay monitoring part 24, that the relay 214 is not normally being operated, the trip generator 28 delivers trip information to a user. For example, the trip generator 28 may inform the user of abnormality of the relay 214 by delivering the trip information to the user through a display of a user terminal. In addition, the trip generator 28 may inform the user of abnormality of the relay 214 by sounding a sound through a speaker of the user terminal.

Hereinafter, an apparatus and method for controlling the operation of the power conversion device according to one embodiment of the present invention will be described in detail with reference to FIGS. 2 to 4.

Figure 4:
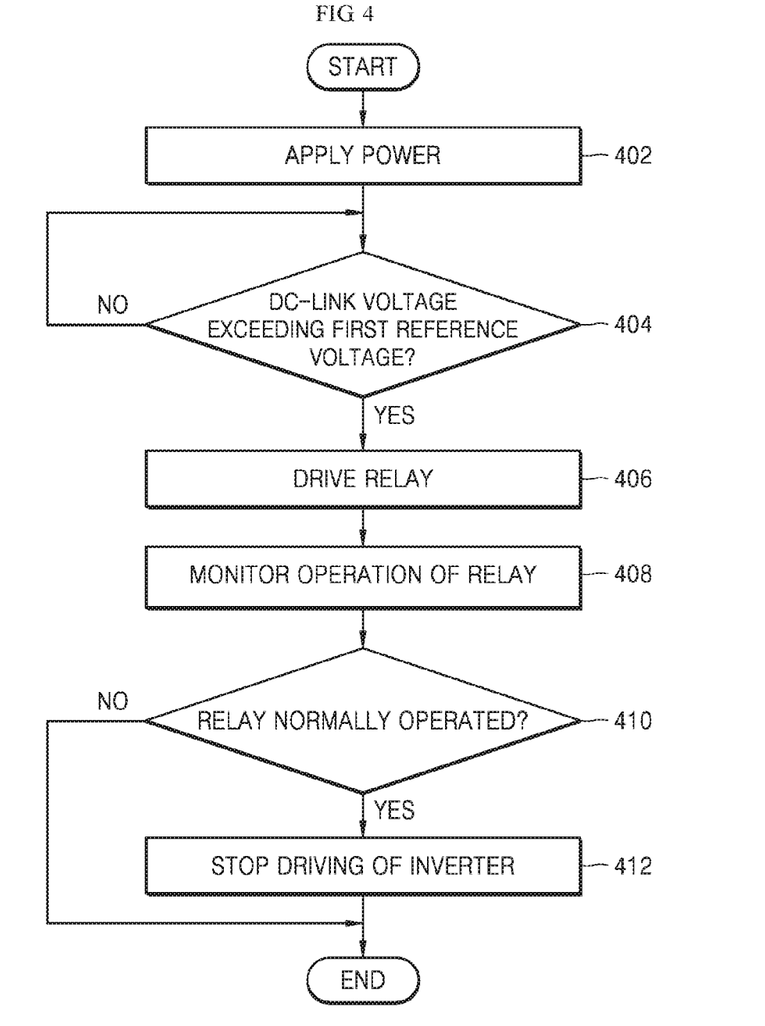
FIG. 4 is a flow chart of a method for controlling the operation of the power conversion device according to one embodiment of the present invention.

FIG. 4 is a flow chart of a method for controlling the operation of the power conversion device according to one embodiment of the present invention.

Referring to FIG. 4, first, the control part 22 drives the power supply 202 to apply power to the inverter 204 (402). Accordingly, power output from the rectifier part 208 is stored in the capacitor of the DC-link part 216 via the initial charging part 210. This process continues until a voltage Vdc of the DC-link part 216 exceeds the preset first reference voltage, which is also called "initial charging operation." In the initial charging operation, the control part 22 does not drive the relay 214 and a current is flown through the initial charging resistor 212.

Referring to FIG. 4 again, in the initial charging operation, the control part 22 determines whether or not the DC-link voltage Vdc exceeds the preset first reference voltage (404). For reference, the first reference voltage may be arbitrarily set by a user.

If it is determined that the DC-link voltage Vdc does not exceed the first reference voltage (NO in 404), the control part 22 prevents the relay 214 from being driven by generating a low voltage trip (LVT). Accordingly, the current continues to be flown through the initial charging resistor 212.

If it is determined that the DC-link voltage Vdc exceeds the first reference voltage (YES in 404), the control part 22 releases the low voltage trip (LVT). Accordingly, the relay operation signal (MC) is delivered to the relay 214 and the relay 214 is driven (406). At this time, the current is flown through the relay 214 rather than the initial charging resistor 212.

When the relay 214 is driven, the relay monitoring part 24 monitors whether or not the relay 214 is actually normally being operated (408). In one embodiment of the present invention, if a voltage measured across the initial charging resistor 212 exceeds a preset second reference voltage, the relay monitoring part 24 outputs the first monitoring signal. Otherwise, the relay monitoring part 24 outputs the second monitoring signal. For reference, the second reference voltage may be set arbitrarily by the user. In this manner, the control part 22 can determine whether or not the relay 214 is normally being operated, by referring to a monitoring signal (MCM), i.e., the first monitoring signal or the second monitoring signal, output by the relay monitoring part 24.

In another embodiment of the present invention, the relay monitoring part 24 may set the second reference voltage based on the resistance of the initial charging resistor 212. More specifically, the relay monitoring part can set the second reference voltage in inverse proportion to the resistance of the initial charging resistor 212. Accordingly, the relay monitoring part 214 can set the second reference voltage in consideration of situations where a voltage is applied as a small current is flown due to a small resistance of the initial charging resistor 212 even when the relay 214 is normally driven.

Figure 3:
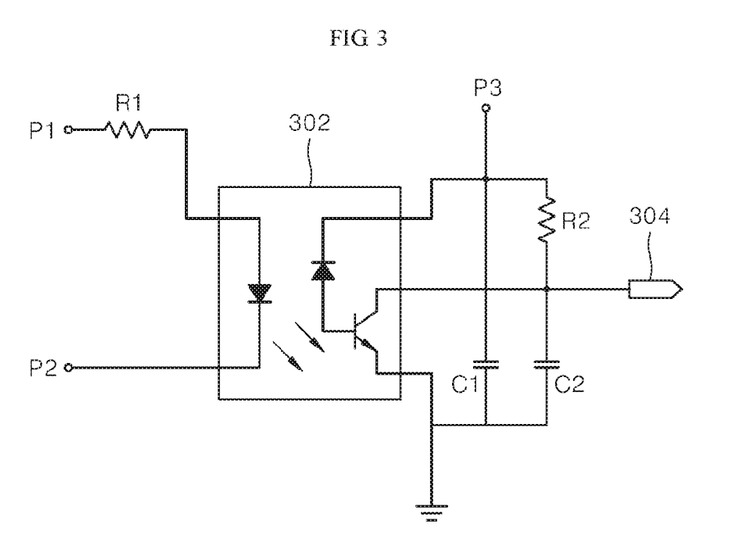
FIG. 3 is a circuit diagram illustrating a relay monitoring part of the apparatus for controlling the operation of the power conversion device according to one embodiment of the present invention.

FIG. 3 is a circuit diagram illustrating a relay monitoring part of the apparatus for controlling the operation of the power conversion device according to one embodiment of the present invention.

Referring to FIG. 3, the relay monitoring part of the apparatus for controlling the operation of the power conversion device according to one embodiment of the present invention includes a current limiting resistor R1 connected in parallel to the initial charging resistor 212, and a photo coupler 302 connected in series to the current limiting resistor R1. An input terminal P1 and an input terminal P2 shown in FIG. 3 are connected to both ends of the initial charging resistor 212, respectively, as shown in FIG. 2.

Based on a result of comparison between the voltage measured across the initial charging resistor 212 through the input terminal P1 and the input terminal P2 and the second reference voltage input through an input terminal P3, the photo coupler 302 outputs the first monitoring signal (e.g., a high level signal) or the second monitoring signal (e.g., a low level signal) through an output terminal 304. For reference, the second reference voltage may be set arbitrarily by the user.

If a current is flown through the relay 214, this means that no current is flown through the initial charging resistor 212. In this case, the voltage across the initial charging resistor 212 becomes 0V which is lower than the second reference voltage. Accordingly, the photo coupler 302 of FIG. 3 is turned off and the first monitoring signal (e.g., a high level signal) is output through the output terminal 304.

If no current is flown through the initial charging resistor 212 despite driving the relay 214, this means that a current is flown through the initial charging resistor 212. In this case, the voltage across the initial charging resistor 212 exceeds the second reference voltage. Accordingly, the photo coupler 302 of FIG. 3 is turned on and the second monitoring signal (e.g., a low level signal) is output through the output terminal 304.

In this manner, by referring to the monitoring signal output through the output terminal 304, the control part 22 can determine whether or not a current is actually normally flown through the relay 214 when the relay 214 is driven.

In particular, in the embodiment of FIG. 3, it is possible to isolate the power input through the input terminal P3 from and the power input through the power supply 202 by using the photo coupler 302.

Referring to FIG. 4 again, the control part 22 determines whether or not the relay 214 is normally being operated, by referring to the monitoring signal output from the relay monitoring part 24 (410).

If it is determined that the relay 214 is not normally being operated (NO in 410), the control part 22 delivers the relay malfunction signal (MCT) to the inverter driving part 26.

Upon receiving the relay malfunction signal (MCT), the inverter driving part 26 stops the driving of the inverter part 220 by not applying a PWM signal to the gates of the switching elements T1 to T6 included in the inverter part 220 (412).

If it is determined that the relay 214 is normally being operated (YES in 410), the control part 22 does not deliver the relay malfunction signal (MCT) to the inverter driving part 26. Upon not receiving the relay malfunction signal (MCT), the inverter driving part 26 drives the inverter part 220 by applying the PWM signal to the gates of the switching elements T1 to T6 included in the inverter part 220.

In addition, although not shown in FIG. 4, if it is determined that the relay 214 is not normally being operated, by referring to a result of the monitoring by the relay monitoring part 24, the trip generator 28 delivers trip information to a user. For example, the trip generator 28 may inform the user of abnormality of the relay 214 by delivering the trip information to the user through a display of a user terminal. In addition, the trip generator 28 may inform the user of abnormality of the relay 214 by sounding a sound through a speaker of the user terminal.

Figure 5:
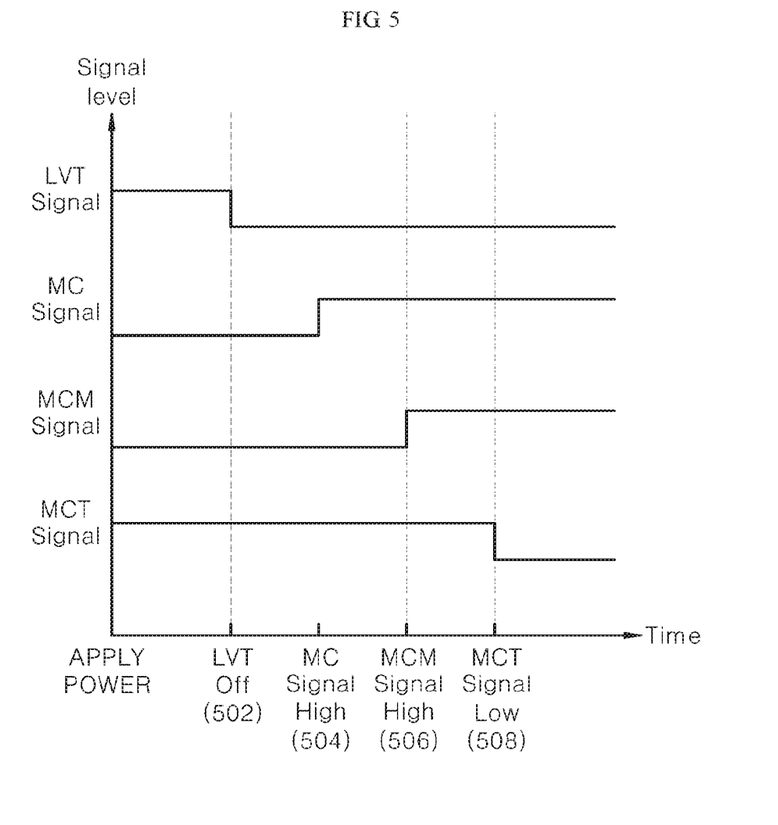
FIG. 5 is a timing diagram of some signals produced when a relay is normally operated in one embodiment of the present invention.

FIG. 5 is a timing diagram of some signals produced when the relay is normally operated in one embodiment of the present invention.

If the DC-link voltage Vdc exceeds the first reference voltage after power is applied from the power supply 202 by the control part 22, the low voltage trip (LVT) is released (502). When the low voltage trip (LVT) is released, the control part 22 delivers the relay operation signal (MC) to the relay 214 (504). Accordingly, the relay 214 begins to be operated.

When the relay 214 is normally operated according to the relay operation signal (MC), a current is flown through the relay 214 rather than the initial charging resistor 212. Accordingly, the relay monitoring part 24 outputs a high level signal, i.e., the first monitoring signal, as a monitoring signal (MCM) (506). Since it is checked that the relay 214 is normally being operated, the control part 22 does not output the relay malfunction signal (MCT) (508).

Figure 6:
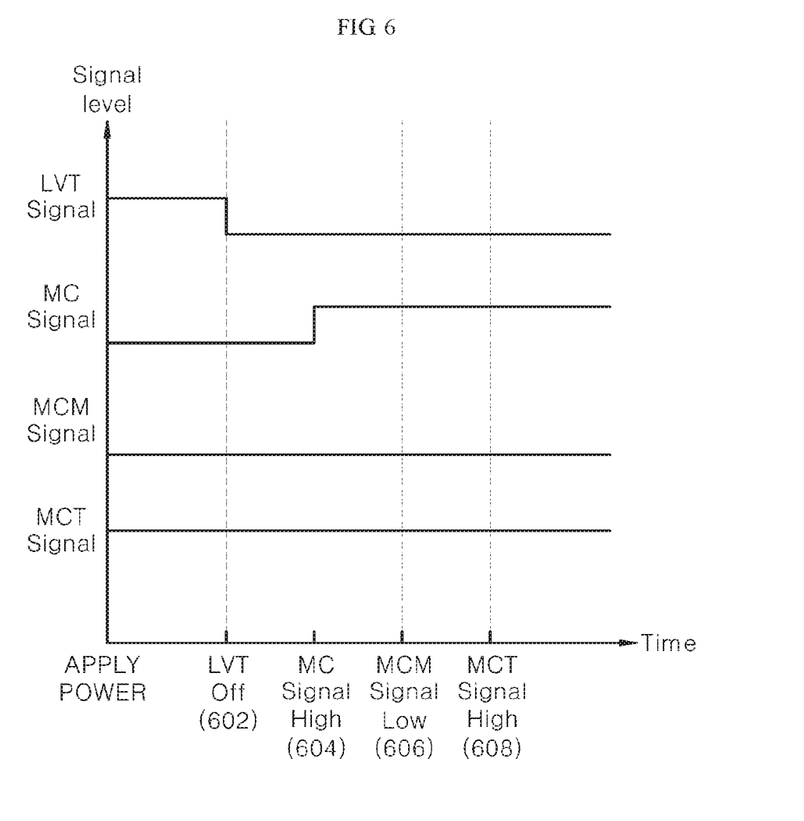
FIG. 6 is a timing diagram of some signals produced when abnormality occurs in the relay in one embodiment of the present invention.

FIG. 6 is a timing diagram of some signals produced when abnormality occurs in the relay in one embodiment of the present invention.

If the DC-link voltage Vdc exceeds the first reference voltage after power is applied from the power supply 202 by the control part 22, the low voltage trip (LVT) is released (602). When the low voltage trip (LVT) is released, the control part 22 delivers the relay operation signal (MC) to the relay 214 (604). Accordingly, the relay 214 begins to be operated.

However, if the relay 214 is not normally being operated although the relay operation signal (MC) is delivered, a current is flown through the initial charging resistor 212 rather than the relay 214. Accordingly, the relay monitoring part 24 outputs a low level signal, i.e., the second monitoring signal, as a monitoring signal (MCM) (606). Since it is checked that the relay 214 is not normally being operated, the control part 22 outputs the relay malfunction signal (MCT) (508). Accordingly, the driving of the inverter part 220 is stopped.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An apparatus for controlling operation of a power conversion device including a rectifier part, an initial charging part, a DC-link part and an inverter part, comprising:
    a control part configured to drive a relay connected in parallel to an initial charging resistor of the initial charging part if a DC-link voltage of the DC-link part exceeds a first reference voltage during initial charging for the DC-link part;
    a relay monitoring part configured to set a second reference voltage based on the resistance of the initial charging resistor and monitor whether or not the relay is normally being operated based on the second reference voltage and measured voltage of the initial charging resistor when the relay is driven; and
    an inverter driving part configured to stop the driving of the inverter part if it is determined that the relay is not normally being operated by referring to a result of the monitoring of the relay monitoring part.

2. The apparatus according to claim 1, wherein the relay monitoring part outputs a first monitoring signal if a voltage measured across the initial charging resistor exceeds the second reference voltage, and outputs a second monitoring signal if the voltage measured across the initial charging resistor does not exceed the second reference voltage.

3. The apparatus according to claim 1, wherein the relay monitoring part includes:
    a current limiting resistor connected to the initial charging resistor; and
    a photo coupler connected to the current limiting resistor.

4. The apparatus according to claim 1, wherein the control part performs an initial charging operation for the DC-link part through the initial charging resistor.

5. The apparatus according to claim 1, further comprising a trip generator configured to deliver trip information to a user if the relay is not normally being operated by referring to the result of the monitoring of the relay monitoring part.

* * * * *